United States Patent [19]

Pribich

[11] 4,146,315

[45] Mar. 27, 1979

[54] LENS MOVING DEVICE FOR OPAQUE READER

[75] Inventor: Boris Pribich, Simi Valley, Calif.

[73] Assignee: Photomatrix Corporation, Santa Monica, Calif.

[21] Appl. No.: 875,169

[22] Filed: Feb. 6, 1978

[51] Int. Cl.$^2$ .................... G03B 21/14; G03B 3/00; G02B 7/02

[52] U.S. Cl. ............................ 353/76; 350/255; 353/101

[58] Field of Search ............... 353/101, 100, 71, 72, 353/73, 76, 77, 78; 350/247, 254, 255, 183

[56] References Cited

U.S. PATENT DOCUMENTS 4,030,821  6/1977  Badalich .......................... 353/71

4,068,935  1/1978  Koester .......................... 353/101

Primary Examiner—Steven L. Stephan
Attorney, Agent, or Firm—Ralph B. Pastoriza

[57] ABSTRACT

A magnification of the displayed image of an opaque reader can be changed between first and second values by a single manual movement. A diopter lens disposed in front of the projection lens provides a first magnification. The single movement functions to remove the diopter lens and simultaneously shift axially the position of the projection lens thereby providing the desired second magnification, the simultaneous movement of the diopter and projection lens from first to second positions assuring that the magnified images under both magnifications are in focus.

5 Claims, 4 Drawing Figures

LENS MOVING DEVICE FOR OPAQUE READER

This invention relates generally to opaque reader instruments and more particularly to a lens moving device for re-arranging the positions of a projection lens and cooperating diopter lens to change the magnification of the reader by a single manual movement.

BACKGROUND OF THE INVENTION

Opaque readers of the type under consideration in the present invention generally comprise a housing structure with a rear projection screen. Within the housing there are provided powerful lights which will illuminate an opaque document, the reflection from the surface of the document then being magnified and focused by an appropriate projection lens onto the rear of the screen. Generally an intercepting mirror is provided between the projection lens and rear screen surface to direct the light so that the object to be viewed can be received in a flat or horizontal orientation and the viewed image on the screen appear in a vertical plane.

Similar housing arrangements are provided for microfilm or microfiche readers except that the light source is disposed behind the film or fiche to project the image in question.

A desirable feature in both types of readers would be to enable a change in the magnification of the projected image in order that certain details of the document could be studied. In the interest of economy and compactness, such change in magnification can be effected without having to change the basic projection lens. Rather, a simple diopter may be disposed between the lens and the screen to provide the magnified image. However, when the diopter is utilized with the projection lens it is necessary to axially shift the lens in order to maintain the magnified image in focus.

In converting back from a magnified image to a normally projected image, the diopter lens would be removed from in front of the projection lens and the projection lens then shifted back to its initial position to again maintain a focused image.

A desirable feature in any type of opaque or film reader incorporating means for changing the magnification would be a simple manual control for requiring only a single movement for both shifting axially the position of the projection lens and removing or reinserting the diopter lens. Moreover, in any such control device a requirement would be for a fine focusing adjustment once one or the other of the two available magnifications is selected.

BRIEF DESCRIPTION OF THE PRESENT INVENTION

Bearing the foregoing considerations in mind, the present invention contemplates the provision of a lens moving device for an opaque reader which meets the above-described desirable features. While this invention will be described in conjunction with an opaque reader, it should be understood that the principle involved could be utilized in any optical device wherein different magnifications of a projected image are desired.

Briefly, the invention contemplates a first means supporting the projection lens for movement between first and second given positions; a second means supporting a diopter lens for movement from a position in axial alignment with the projection lens to a position out of axial alignment with the projection lens; and, a third means intercoupled with the first and second means for moving the projection lens from the first to the second given position and simultaneously moving the diopter lens from said position in axial alignment with the projection lens to said position out of axial alignment with the projection lens.

With the foregoing arrangement, the magnification of a projected image by the projection lens can be changed while still maintaining the image in focus, all by a single manual movement.

A further feature of the invention provides for a fine focusing adjustment with the same third means utilized for moving the projection and diopter lenses.

BRIEF DESCRIPTION OF THE DRAWINGS

A better understanding of this invention will be had by now referring to the accompanying drawings in which.

DETAILED DESCRIPTION OF THE INVENTION

Figure 1:
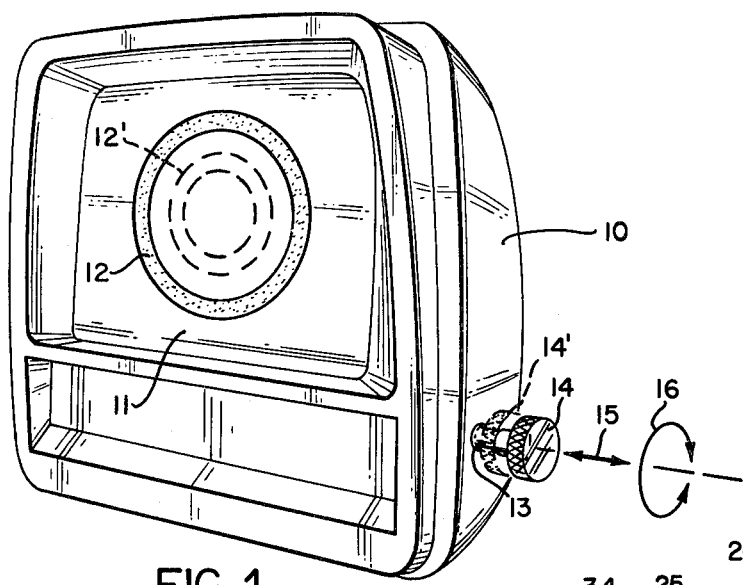
FIG. 1 is a perspective view of a typical opaque reader with which the lens moving device of this invention is used.

Referring first to FIG. 1 there is shown, by way of example, an optical reader comprising a housing 10 with a generally vertically disposed rear projection screen 11. An image is illustrated at 12 in the form of a circle projected onto the rear of the screen from a corresponding opaque document within the machine exhibiting this symbol.

Shown on the lower right side of the casing 10 of the opaque reader is a manually movable means in the form of a rod member 13 terminating in a knob 14. The rod 13 is arranged to be moved in and out in the direction of the double-headed arrow 15 and also to be rotated as indicated by the double-headed arrow 16.

In the particular embodiment illustrated in FIG. 1, inward movement of the knob 14 and rod 13 from a first to a second position indicated by the phantom lines at 14' decreases the magnification of the projected image 12 to a smaller size as indicated by the phantom lines 12' on the rear projection screen 11. Correspondingly, outward movement of the knob 14 from its phantom line position 14' back to its original position will increase the magnification to the original image 12 on the rear projection screen 11.

Manual rotation of the knob 14 as indicated by the heretofore described double-headed circular arrow 16 enables fine focusing of the image to be achieved in either the first or second position of the knob and rod.

Figure 2:
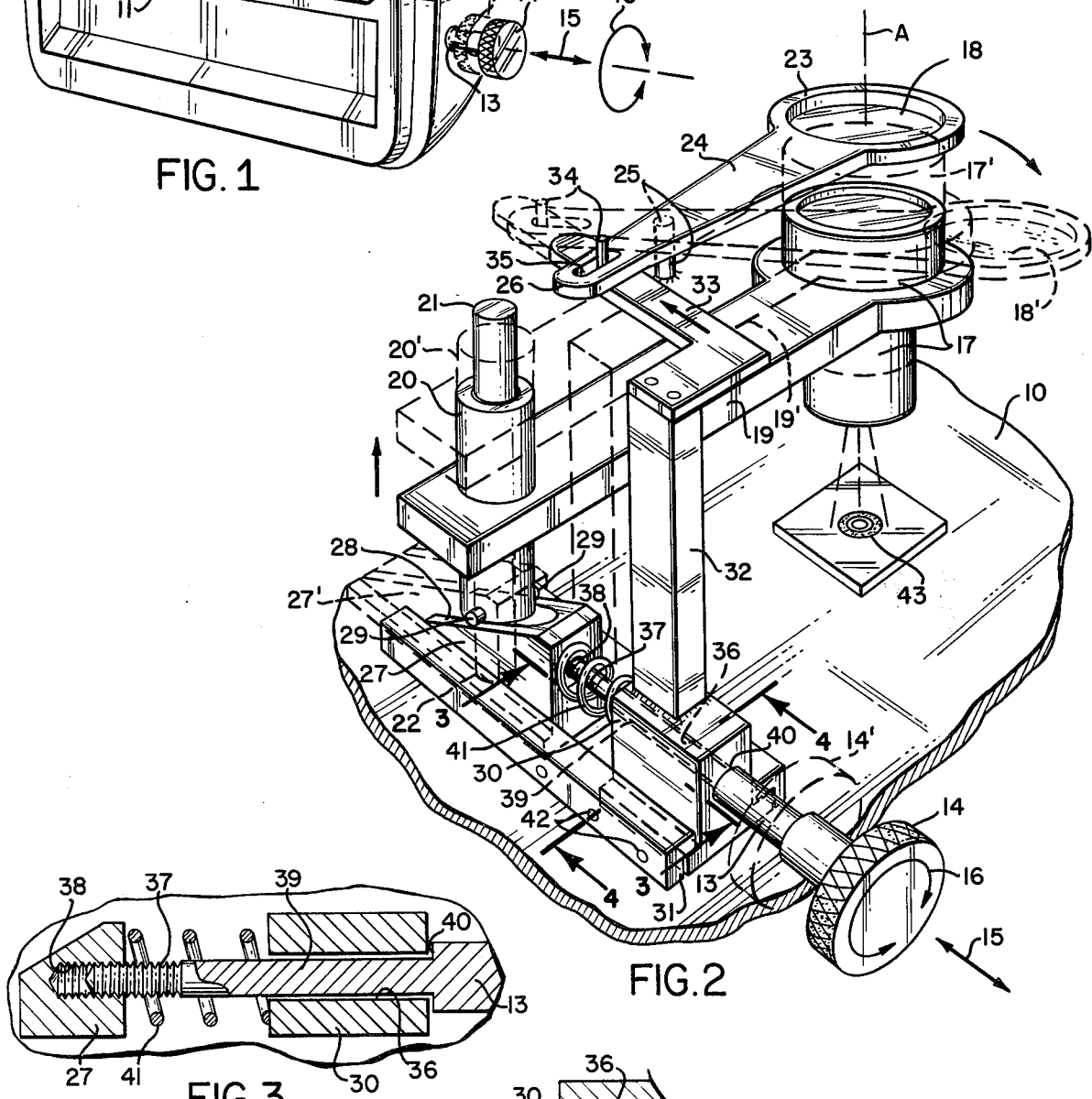
FIG. 2 is an enlarged perspective view with various portions exaggerated in size for purposes of clarity illustrating the lens moving device itself for the opaque reader of FIG. 1.

The manner in which the magnification is changed as described in FIG. 1 by the rod 13 and knob 14 as well as the fine focusing feature will now become evident by referring to the detailed perspective view of FIG. 2.

Shown in the upper right-hand portion of FIG. 2 is a projection lens 17 with a diopter lens 18 disposed in axial alignment therewith. A first mounting means in the form of a horizontal bar 19 mounts the projection lens 17 at one end and is fixed to a vertical guide cylinder 20 at its other end. Guide cylinder 20 is arranged to ride up and down on a fixed vertical post 21 secured at its lower end to the housing frame 10 as indicated at 22 in phantom lines. This first mounting means will thus guide the projection lens 17 for axial movement between first and second given positions. The first given position in FIG. 2 is illustrated in solid lines and the second given position in phantom lines as indicated at 17' for the lens 17 and 19' and 20' for the bar 19 and guide cylinder 20 respectively.

A second mounting means for supporting the diopter lens 18 is shown above the bar 19 and includes a lens support 23 having a lateral arm 24. A fixed pivot 25 mounts the arm 24 at a point between the diopter lens 18 and the extreme opposite end 26 of the arm so that the lens can swing about the pivot in its own plane; that is, an horizontal plane as viewed in FIG. 2. Essentially, the diopter lens 18 in the solid line position shown is in axial alignment with the projection lens 17 and when swung about the pivot 25, is moved to a position out of axial alignment with the projection lens 17.

Referring now to the lower left portion of FIG. 2, there is shown a wedge means 27 including an inclined surface 28 engaging a pin 29 secured to the lower portion of the guide cylinder 20. The wedge 27 is forked as illustrated so that there are actually provided a pair of inclined surfaces corresponding to 28 straddling either side of the guide cylinder 20, a further pin corresponding to the pin 29 riding on the other inclined surface portion.

The foregoing arrangement is such that when the wedge means 27 is moved in an horizontal plane normal to the direction of the lens axis A as shown in FIG. 2, it will cam the guide cylinder 20 and fixed bar 19 upwardly to the second phantom line position as described.

Still referring to the lower portion of FIG. 2, there is shown a slide block 30 longitudinally movable in an horizontal direction within appropriate guide tracks such as indicated at 31. The top of the slide block 30 carries an interconnecting means including an upward extension 32 and link member 33 coupled to the end portion 26 of the arm 24 for the diopter lens 18. In this respect, the coupling includes a pin 34 passing through a slot 35 in the end portion 26 of the arm. The arrangement is such that when the slide block 30 is moved within the guide tracks 31, the link 33 will move as indicated by the arrow and thereby cause swinging movement of the diopter lens from the solid line position illustrated at 18 to the phantom line position illustrated at 18'.

Figure 3:
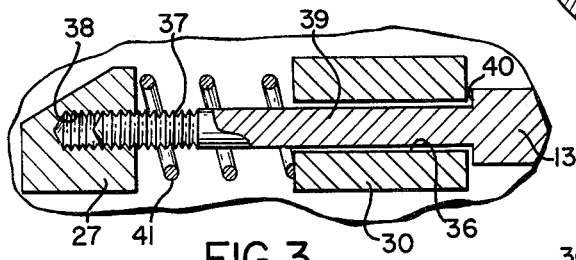
FIG. 3 is an enlarged fragmentary cross section taken in the direction of the arrows 3—3 of FIG. 2; and, FIG. 4 is another enlarged fragmentary cross section taken in the direction of the arrows 4—4 of FIG. 2.

As best shown in the enlarged fragmentary cross section of FIG. 3, the slide block 30 has an internal bore 36 through which the rod member 13 from knob 14 passes. The extending end of the guide rod from the slide block 30 terminates in threads 37 received in a threaded opening 38 in the wedge means 27.

Still referring to FIG. 3, the rod member 13 includes a reduced diameter portion 39 actually disposed within the bore 36 of the slide block 30 to define an annular shoulder 40 at the entrance portion of the rod 13 into the bore. A coil compression spring 41 in turn is positioned between the wedge means 27 and exit end portion of the slide block 30 as shown in both FIGS. 2 and 3 to bias th slide block 30 against the shoulder 40.

With the foregoing arrangement, longitudinal movement of the rod member 13 as by movement of the knob 14 into and out of the reader housing moves the wedge means 27 through the threaded connection of the end of the rod in the wedge means. The spring 41 itself takes up any play or blacklash in this threaded connection.

With the foregoing arrangement, and referring once again to FIG. 2, it will be appreciated that moving the rod 13 in a forward direction will slide the slide block 30 within the guide track 31 in the same direction because of the bearing of the annular shoulder 40 on the entrance end of the slide block. Also, the wedge means 27 will simultaneously be urged in the same direction by the threaded connection to the end of the rod 13 to thereby cam the first mounting means for the projection lens 17 from its first solid line position shown to its second phantom line position. In either one of these positions, very slight fine adjustments can be made in the axial position of the projection lens 17 by simply rotating the knob 14 which will thread the end further into or further out of the threaded opening 38 of the wedge means 27 thus moving this wedge means very slightly relative to the slide block 30 and effecting fine vertical adjustments of the first mounting for the projection lens.

The distance through which the projection lens is moved between the referred to first and second positions is such that the projected image will remain in focus and towards this end, it is desirable to index the slide block to these first and second positions so that an operator in manually moving the rod can tell by feel when the proper position is reached.

In accord with the particular embodiment disclosed, this indexing of the slide block takes the form of cooperating spring biased ball and detent means illustrated at 42 in phantom lines in a side portion of the guide track 31 in FIG. 2.

Figure 4:
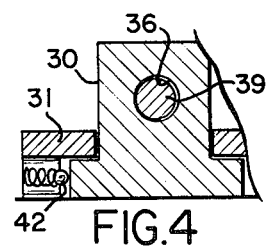

The fragmentary cross section of FIG. 4 shows this spring biased ball detent means 42 in greater detail and it will be evident that spaced detents in the lower side portion of the slide block 30 will receive a corresponding spring biased ball 42 when in its first or second position.

In FIG. 4, the bore 36 is clearly shown in the slide block 30 together with a cross section of the reduced diameter portion 39 of the rod 13.

Referring once again to FIG. 2 there is shown a symbol in the form of a zero at 43 constituting an opaque document. It is this zero symbol 43 chosen merely by way of example which is projected by the projection lens 17 to provide the image 12 described in FIG. 1 when the projection lens and diopter lens are in the solid line position shown in FIG. 2.

OPERATION

The operation of the lens moving device for the opaque reader in accord with this invention will be evident from the foregoing description.

When the projection lens 17 is in its solid line position illustrated in FIG. 2, the knob 14 and rod 13 are in their outermost position and the diopter lens 18 is in axial alignment with the axis A of the lens. Under these conditions, the symbol 43 will be projected and magnified for example 23 times.

To reduce the magnification and thus permit more of the opaque document to be projected onto the rear projection screen 11 the knob 14 is manually urged inwardly to thereby slide the wedge means 27 illustrated in FIG. 2 and thus cam upwardly the guide cylinder 20 and thus the projection lens 17 to the phantom line position illustrated at 17'. Simultaneously, the interconnecting structure 32 and link 33 will move forwardly with the slide block 30 and thereby swing the diopter lens 18 from out of axial alignment with the lens 17; that is, to the dotted line position 18' of FIG. 2. In this second position of the projection lens 17, there will be provided the reduced magnified image 12' illustrated in phantom lines in FIG. 1.

In either the first or second position, the knob 14 can be rotated as described to effect slight adjustments in the position of the wedge means 27 and thus enable fine focusing of the projection lens 17. Of course, the described indexing means in the form of the spring biased detent ball 42 described in FIG. 4 will position the slide block and thus the wedge means properly for correct focus but in some instances, the opaque document to be projected may have a different thickness than a standard and thus be closer to the projection lens than another type of document. It is for this reason that fine focusing adjustments are desirable to raise or lower the projection lens 17 slightly relative to the document.

From all of the foregoing, it will thus be evident that the present invention has provided a unique arrangement permitting the magnification of a projected image to be changed between first and second values wherein the same projection lens may be utilized.

Equivalent mechanical means for simultaneously moving the projection lens and diopter lens between the described first and second positions falling within the scope and spirit of this invention will, of course, occur to those skilled in the art. The lens moving device accordingly is not to be thought of as limited to the specific example set forth and illustrated in the accompanying drawings.

We claim:

1. In a opaque reader having a projection lens and a diopter lens wherein the projection lens with the diopter lens in axial alignment provides a first given magnification in a first given position and wherein the projection lens without the diopter lens provides a second given magnification when axially moved to a second given position, a lens moving device for said opaque reader including, in combination:
   (a) first mounting means supporting said projection lens for movement between said first and second given positions;
   (b) second mounting means supporting said diopter lens for movement from a position in axial alignment with said projection lens to a position out of axial alignment with said projection lens;
   (c) a manually movable means including a wedge means movable in a plane normal to the axis of said projection lens, said wedge means including an inclined surface engaging said first mounting means such that manual movement of said wedge means from a first to a second position results in said inclined surface camming said first mounting means in said axial direction to thereby move said projection lens from said first given position to said second given position; and,
   (d) an interconnecting means between said manually movable means and said second mounting means so that manual movement of said manually movable means from said first to said second position simultaneously moves said diopter lens out of axial alignment with said projection lens.

2. The subject matter of claim 1, in which said manually movable means includes a slide block having a bore; and a rod member having a knob at one end and terminating in a screw thread at its other end passing through said bore, said wedge means having a threaded opening receiving the threaded end of said rod said block and rod being longitudinally movable together to thereby move said wedge means between said first and second positions, said interconnecting means being mounted on said block for movement therewith, said rod being rotatable in said bore by said knob to thread further into or further out of the threads in said threaded opening of said wedge means whereby said wedge means can be moved relatively to said block by rotating said rod to thereby provide a fine adjustment for focusing said projection lens.

3. The subject matter of claim 2, in which said rod includes a reduced diameter portion passing through said bore to define an annular shoulder at its entrance portion to said bore and thereby key the rod against further longitudinal movement in said bore; and a coiled compression spring between said wedge means and the end of said block from which said rod exits to hold said block seated on said shoulder, said spring taking up any play in the threaded connection between said rod and said wedge means.

4. The subject matter of claim 2, in which said second mounting means for said diopter lens includes a lens support having a lateral arm; a pivot mounting said arm between said diopter lens and the extreme end of said arm so that said lens can swing about said pivot in its own plane; and a connecting link member mounted on said block and coupled to the end portion of said arm so that movement of said block swings said diopter lens in its own plane about said pivot mounting.

5. The subject matter of claim 2, including longitudinal guide means for said slide block and wedge means; and cooperating spring biased ball and detent means for indexing said block with respect to said longitudinal guide means in said first and second positions respectively.

* * * * *